United States Patent
Garner et al.

(10) Patent No.: US 11,441,736 B2
(45) Date of Patent: Sep. 13, 2022

(54) MULTI-VESSEL FLUID STORAGE AND DELIVERY SYSTEM

(71) Applicant: Westport Fuel Systems Canada Inc., Vancouver (CA)

(72) Inventors: Gage D. Garner, Vancouver (CA); Melih Ogmen, Port Moody (CA)

(73) Assignee: WESTPORT FUEL SYSTEMS CANADA INC., Vancouver (CA)

(*) Notice: Subject to any disclaimer, the term of this patent is extended or adjusted under 35 U.S.C. 154(b) by 29 days.

(21) Appl. No.: 17/080,758

(22) Filed: Oct. 26, 2020

(65) Prior Publication Data

US 2021/0041066 A1 Feb. 11, 2021

Related U.S. Application Data

(62) Division of application No. 15/739,138, filed as application No. PCT/CA2016/050766 on Jun. 29, 2016, now Pat. No. 10,865,943.

(Continued)

(51) Int. Cl.
*F02D 41/30* (2006.01)
*F17C 7/04* (2006.01)
(Continued)

(52) U.S. Cl.
CPC .......... *F17C 7/04* (2013.01); *F04B 23/02* (2013.01); *F04B 49/08* (2013.01); *F17C 13/02* (2013.01);
(Continued)

(58) Field of Classification Search
CPC .... F17C 7/04; F02D 41/0027; F02D 41/3082; F02M 21/0245
(Continued)

(56) References Cited

U.S. PATENT DOCUMENTS 7,497,180 B2 * 3/2009 Karlsson .......... F17C 7/00
114/74 R
7,497,780 B2 ‡ 3/2009 Kiraly .......... A63B 71/0605
463/42

(Continued)

FOREIGN PATENT DOCUMENTS

CA 623816 A ‡ 7/1961
CA 623816 A 7/1961
(Continued)

OTHER PUBLICATIONS

International Search Report and Written Opinion of the International Searching Authority, mailed Sep. 14, 2016.‡

(Continued)

*Primary Examiner* — Paul J Gray
(74) *Attorney, Agent, or Firm* — Carie C. Mager

(57) ABSTRACT

A multi-vessel fluid storage and delivery system is disclosed which is particularly useful in systems having internal combustion engines which use gaseous fuels. The system can deliver gaseous fluids at higher flow rates than that which can be reliably achieved by vapor pressure building circuits alone, and that keeps pressure inside the storage vessel lower so that it reduces fueling time and allows for quick starts thereafter. The system is designed to store gaseous fluid in liquefied form in a plurality of storage vessels including a primary storage vessel fluidly connected to a pump apparatus and one or more server vessels which together with a control system efficiently stores a liquefied gaseous fluid and quickly delivers the fluid as a gas to an end user even when high flow rates are required. The system controls operation of the pump apparatus as a function of the (Continued)

measured fluid pressure, and controls the fluid pressure in a supply line according to predetermined pressure values based upon predetermined system operating conditions.

19 Claims, 6 Drawing Sheets

Related U.S. Application Data

(60) Provisional application No. 62/186,207, filed on Jun. 29, 2015.

(51) Int. Cl.
  *F17C 13/02* (2006.01)
  *F04B 23/02* (2006.01)
  *F04B 49/08* (2006.01)

(52) U.S. Cl.
  CPC .......... *F17C 13/021* (2013.01); *F17C 13/025* (2013.01); *F04B 2205/05* (2013.01); *F17C 2201/056* (2013.01); *F17C 2201/058* (2013.01); *F17C 2205/0146* (2013.01); *F17C 2205/0335* (2013.01); *F17C 2205/0338* (2013.01); *F17C 2221/033* (2013.01); *F17C 2223/0161* (2013.01); *F17C 2223/033* (2013.01); *F17C 2223/041* (2013.01); *F17C 2225/0115* (2013.01); *F17C 2225/0123* (2013.01); *F17C 2225/0153* (2013.01); *F17C 2225/033* (2013.01); *F17C 2227/0107* (2013.01); *F17C 2227/0135* (2013.01); *F17C 2227/0178* (2013.01); *F17C 2227/0185* (2013.01); *F17C 2227/0309* (2013.01); *F17C 2227/0323* (2013.01); *F17C 2227/0393* (2013.01); *F17C 2227/043* (2013.01); *F17C 2227/046* (2013.01); *F17C 2250/032* (2013.01); *F17C 2250/043* (2013.01); *F17C 2250/0408* (2013.01); *F17C 2250/0439* (2013.01); *F17C 2250/0626* (2013.01); *F17C 2250/0636* (2013.01); *F17C 2265/066* (2013.01); *F17C 2270/0105* (2013.01); *F17C 2270/0139* (2013.01); *F17C 2270/0168* (2013.01); *F17C 2270/0171* (2013.01); *F17C 2270/0173* (2013.01); *F17C 2270/0176* (2013.01); *F17C 2270/0178* (2013.01)

(58) Field of Classification Search
  USPC .......................................................... 141/82
  See application file for complete search history.

(56) References Cited

U.S. PATENT DOCUMENTS

| | | | | |
|---|---|---|---|---|
| 9,771,886 B2 ‡ | 9/2017 | Garner | ............... | F02M 21/0287 |
| 2007/0051114 A1 ‡ | 3/2007 | Mahlanen | ................ | B63J 99/00 62/50 |
| 2012/0240874 A1 ‡ | 9/2012 | Yoo | ........................... | F17C 9/02 123/3 |
| 2013/0139544 A1 ‡ | 6/2013 | Mak | ....................... | F25J 1/0025 62/611 |
| 2014/0096539 A1 ‡ | 4/2014 | Gustafson | ................ | F17C 7/04 62/49 |
| 2014/0299101 A1 ‡ | 10/2014 | Melanson | ................ | F17C 5/02 123/44 |

FOREIGN PATENT DOCUMENTS

| | | | | | |
|---|---|---|---|---|---|
| CA | 2796794 | C | | 5/2014 | |
| CA | 2796794 | C | ‡ | 5/2014 | ......... F02M 21/0245 |
| CN | 101952635 | A | ‡ | 1/2011 | ............ F17C 13/021 |
| CN | 101952635 | A | | 1/2011 | |
| CN | 102648123 | A | ‡ | 8/2012 | ............. B63B 27/34 |
| CN | 102648123 | A | | 8/2012 | |
| CN | 104010915 | A | | 10/2014 | |
| CN | 104010915 | A | ‡ | 10/2014 | ............. B60K 15/07 |
| GB | 947856 | A | ‡ | 1/1964 | ............... A62B 7/14 |
| GB | 947856 | A | | 1/1964 | |
| JP | 2014129086 | A | ‡ | 7/2014 | ............. B63H 21/38 |
| JP | 2014129086 | A | | 7/2014 | |
| WO | 200981278 | A1 | | 7/2009 | |
| WO | 2009081278 | A1 | | 7/2009 | |
| WO | WO-200981278 | A1 | ‡ | 7/2009 | |
| WO | WO-2009081278 | A1 | ‡ | 7/2009 | ............ F17C 13/021 |
| WO | 2014078962 | A1 | | 5/2014 | |

OTHER PUBLICATIONS

Extended European Search Report Received, mail date of Mar. 19, 2019.‡

CN Search Report, CNIPA mail date of Jul. 1, 2019 (English Translation thereof).‡

WO 2014078962 A1; Garner, Gage D et al.; May 30, 2014 (Year: 2014).‡

International Search Report and Written Opinion of the International Searching Authority, dated Sep. 14, 2016.

Extended European Search Report Received, dated Mar. 19, 2019.

\* cited by examiner
‡ imported from a related application

MULTI-VESSEL FLUID STORAGE AND DELIVERY SYSTEM

FIELD OF THE INVENTION

The present application relates to a multi-vessel fluid storage and delivery system. More particularly, the multi-vessel fluid storage system stores a gaseous fluid in liquefied form and delivers it to an end user. In an exemplary embodiment the end user is an internal combustion engine and the gaseous fluid is a gaseous fuel, such as natural gas.

BACKGROUND OF THE INVENTION

Gaseous fuels can be stored at cryogenic temperatures when employed as fuel for internal combustion engines. A gaseous fuel is defined herein as any fuel that is in a gas state at standard temperature and pressure, which in the context of this application is 20 degrees Celsius (° C.) and 1 atmosphere (atm). By way of example, typical gaseous fuels include, without limitation, natural gas, propane, hydrogen, methane, butane, ethane, other known fuels with similar energy content, and mixtures including of these fuels. Natural gas itself is a mixture, and it is a popular gaseous fuel for internal combustion engines because it is abundant, less expensive and cleaner burning than oil-based liquid fuels, and the sources are broadly dispersed geographically around the world. The gaseous fuel is stored near its boiling point in a storage vessel. For example, for methane at a storage pressure of about 1 atmosphere it can be stored in liquefied form at a temperature of about −161 degrees Celsius (° C.). Natural gas is a mixture of gasses that varies in composition depending upon the source, but methane is typically the largest fraction, so while storage temperature can vary, it is normally close to that of methane. From the storage vessel the gaseous fuel can be supplied in either a liquefied or a vapor state to a vaporizer where the temperature of the gaseous fuel is increased for delivery of the gaseous fuel at a desired pressure and temperature to an engine.

There are advantages to storing the gaseous fuel in a liquefied state. The density increases when the gaseous fuel is in the liquid state compared to either the supercritical state or the gas state requiring a smaller volume to store an equivalent amount of fuel on an energy basis. After vaporization in a vaporizer, a fuel injection system receives vaporized gaseous fuel and introduces it, either directly or indirectly, to one or more combustion chambers in an engine. As used herein, vaporizing refers to at least increasing the enthalpy (that is, temperature) of the gaseous fuel as it passes through the vaporizer, and depending upon the pressure and the temperature of the gaseous fuel it can also refer to changing the state of the gaseous fuel to the gas state. While natural gas (referred to as "LNG" when stored in liquefied form) is an exemplary gaseous fuel, other gaseous fuels are equally applicable to the technique described herein.

It is important to control the pressure of the gaseous fuel within its cryogenic supply vessel as well as the pressure and temperature at which it is supplied to a gaseous fueled engine system. The pressure and temperature must be above predetermined minimum values such that fuel can be delivered at a needed injection pressure to an engine while keeping pressure and temperature within the storage vessel below levels that would cause venting to atmosphere.

For engines that deliver the fuel into the engine intake air stream before it enters the combustion chamber or directly into the engine combustion chamber early in the compression cycle, a fuel delivery pressure in the range of 60-150 psig (4-10 bar) is sufficient to deliver the commanded amount of gaseous fuel at the desired fueling rate, depending upon the particular design of the engine, and engine system characteristics such as the engine compression ratio. Known fuel delivery arrangements have used the vapor pressure within the storage vessel to generate a desired delivery pressure without a pump or compressor. Over time heat leaks into the thermally insulated storage vessel causing the vapor pressure to increase. In addition, it is known for some systems to use a pressure building circuit that can be activated to recirculate a warmed fuel stream into the storage vessel to increase the pressure when necessary. However for larger engine system applications; such as those used in heavy duty trucks, ships and trains, it is difficult to keep up with fuel demand when using pressure building circuits to maintain a desired pressure to satisfy a higher fuel flow demand associated with the higher fuel consumption rates. Prior art systems have solved this inability to keep up with demand by using much larger and expensive vaporizers in an attempt to increase the pressure in the storage vessel to keep up with fuel demand; however, these systems can be vulnerable to interruptions in fuel supply when the cold fuel in the vessel collapses the pressure in the vapour and the pressure must then be rebuilt up in the vapor space. Another problem associated with this approach is that the vessel pressure is being increased primarily from the introduction of heat which results in shorter hold times as well as excess venting. Venting vapor from the storage vessel can be wasteful and leads to undesirable emissions if the vented fuel is not recovered. Furthermore, a storage vessel takes longer to fill when the pressure is higher. Normally a vessel is vented to reduce the pressure before it is re-filled, and this takes time. If a vehicle is being filled at a public filling station, the vehicle owner may not be compensated for any fuel that is vented back to the filling station. Some filling stations may not be equipped to receive the vented fuel and in such circumstances the vented fuel would be wasted. Accordingly, it can be advantageous for the pressure inside the storage vessel to be lower when it needs to be re-filled.

US Patent Application Publication Number 2014/0096539 (the '539 application) teaches an arrangement for a pressure building circuit that employs a compressor that can be activated to increase the pressure in the fuel storage vessel for a single vessel or for increasing the pressure in all storage vessels in a multi-vessel arrangement. However, a problem with this arrangement is that as it is employed to increase the pressure in each of the vessels to dispense fuel, it also increases the temperature inside each of the storage vessels, which can result in more venting and a longer time spent at the filling station to vent down before filling and to build up the desired pressure after filling. That is, the overall time required to fill a system with this arrangement can be an inconvenience for the user.

For the transportation industry, there are some variations in the design of LNG filling stations. Some stations are designed to deliver LNG with a saturation pressure of between 50 and 80 psig, and this is sometimes referred to as "cold LNG" because to store the LNG at a lower saturation pressure it must be stored at a lower temperature (compared to "warm LNG" which typically has a saturation pressure between 100 to 150 psig). "Cold LNG" is desirable because it is more dense offering an increased range for a given vessel size and the potential for longer hold times. Other LNG filling stations are designed to deliver warm LNG and because of the higher saturation pressure, the warm LNG has a higher temperature compared to that of cold LNG. A problem with the aforementioned prior art solutions is that when the fuel storage vessels are filled with cold LNG, the pressure in the storage vessel is much lower than the pressure needed to deliver fuel to the engine so there is an immediate need to build up the pressure after re-filling. With systems following the architecture of the '539 application, the compressor in the pressure building circuit is installed outside the storage vessel and downstream from the vaporizer so it takes a long time for enough fuel to flow through the pressure building circuit to increase the pressure in the storage vessel to the level required for fueling an engine. The delay associated with building the requisite pressure can be on the order of 5 to 10 minutes which represents a noticeable inconvenience for the driver of an LNG fueled vehicle, increasing the time needed to re-fill each LNG fueled vehicle and reducing the potential income to LNG filling stations.

To address the problems associated with higher fuel consumption and providing enough fuel, another approach is taught by the applicant's Canadian Patent No. 2,796,794 (the '794 patent) which is incorporated herein by reference. The '794 patent teaches a system that delivers fuel from the vapor space when the vessel pressure is sufficient to deliver the commanded amount and activates a pump disposed within the fuel storage vessel to deliver fuel when the vessel pressure is not sufficiently high. This system does not require the introduction of any heat into the storage vessel (reducing venting) and the vessel pressure can be kept low to reduce filling time. Because the pump is disposed inside the fuel storage vessel, it is always at the same temperature as the stored fuel so no cool-down time is needed before it can be operated, and the pump intake is immersed in the LNG stored in the associated fuel vessel so it can be operated to immediately deliver fuel at the requisite pressure for starting the engine. In addition, it is always more efficient to pump a liquid compared to compressing a gas or vapor so another advantage of this approach is that less energy is consumed for operation. A drawback is that for multi-vessel systems it can be more expensive because a pump is employed in each fuel vessel.

Accordingly, there is a need for an improved gaseous fuel delivery system that is less expensive, that can deliver fuel at higher flow rates than that which can be reliably achieved by vapor pressure building circuits alone, and that keeps pressure inside the storage vessel lower so that it takes less time to fill at a filling station.

SUMMARY OF THE INVENTION

A method and system for storing a gaseous fluid in liquefied form in a plurality of storage vessels and delivering a warm gas to an end user are described herein. The multi-vessel fluid storage and delivery system has a primary storage vessel for storing a gaseous fluid in liquefied form (the gaseous fluid being in gaseous form at standard temperature and pressure, but stored in liquefied and vapor form in the primary storage vessel); at least one secondary vessel that acts as a server storage vessel for storing the gaseous fluid in liquefied and vapor form (as well as functioning as an accumulator); a pump apparatus in fluid communication with the primary storage vessel for receiving and pressurizing the fluid therefrom and delivering it to the at least one server storage vessel(s) through a discharge line; and a supply line in fluid communication with the one or more server storage vessel(s) for receiving the fluid therefrom and delivering it to an end user. Additionally the system has a first vaporizer disposed on the discharge line between the pump apparatus and the supply line and operable to heat the fluid that flows through the discharge line; a second vaporizer disposed on the supply line and operable to heat the fluid that flows through the supply line. In some embodiments, the first and second vaporizers are integrated in a single vaporizer housing. Additionally, there is at least one pressure sensor for measuring fluid pressure in the supply line; and a control system in communication with the pressure sensor, to receive fluid pressure measurements from the pressure sensor. The pressure sensor can be in fluid communication with either the vapor space of the at least one server storage vessel; or in fluid communication with the end user; or both. The control system is also in communication with the pump apparatus, to send command signals to the pump apparatus to control operation as a function of the measured fluid pressure, and to control fluid pressure in the supply line according to predetermined pressure values based upon predetermined system operating conditions. The predetermined operating conditions include at least one of an end user fluid flow demand, a storage vessel liquefied gaseous fluid level, and a measured temperature that correlates to an operational temperature of the first vaporizer.

An end user can be an internal combustion engine with the gaseous fluid being a gaseous fuel that is combustible in the internal combustion engine; such as natural gas, methane, butane, propane, ethane, hydrogen, biogas, or a mixture having at least one of these gaseous fuels. The first and second vaporizers can be heat exchangers with engine coolant being circulated from the engine coolant system to flow through the respective heat exchangers to transfer heat energy to the gaseous fuel delivered from the respective primary and one or more server storage vessels. The pressure sensor can be installed on a conduit in fluid communication with the vapor space of at least one server storage vessel upstream of the second vaporizer and/or installed on a conduit in fluid communication with the supply line downstream of the second vaporizer depending on the system design and operational preferences.

The control system commands the pump apparatus to supply liquefied gaseous fluid to the discharge line when the pressure in at least one of the discharge line and the supply line is below a predetermined low pressure value; and to stop supplying liquefied gaseous fluid to the discharge line when the pressure in at least one of the discharge line and the supply line is above a predetermined high pressure value.

In some embodiments a second pressure sensor can be associated with a primary vessel vapor line fluidly connecting a vapor space of the primary storage vessel with an inlet into the first vaporizer, wherein the control system receives pressure measurements from the second pressure sensor and manages fluid flow from the primary vessel through the primary vessel vapor line to the first vaporizer as a function of the pressure measurements received from the second pressure sensor and predetermined operating conditions that dictate when to withdraw vapor instead of liquefied gaseous fluid from the primary storage vessel. The control system commands the pump apparatus to supply liquefied gaseous fluid to the discharge line when the pressure in either the discharge line or the supply line is below a predetermined low pressure value and when the measured temperature is above a predetermined high temperature value.

The system can include a server vessel vapor line associated with the inlet of each of the at least one server storage vessel(s) with the server vessel vapor line fluidly connecting a vapor space of each of the server storage vessel(s) with an inlet into the second vaporizer; and a bypass vapor line valve is disposed in each of the server vessel vapor lines to control flow therethrough, wherein the control system manages flow through each server vessel vapor line as a function of the pressure measurements received from the pressure sensor and predetermined operating conditions that dictate when to withdraw fluid from the vapor space instead of liquefied gaseous fluid from each of the at least one server storage vessel(s). When any one of, or all of, the server storage vessel bypass vapor line valves is opened, gaseous fluid from the primary storage vessel is directed to the end user through all of the server vessel vapor lines associated with an open server storage vessel bypass vapor line valve. When the server vessel bypass vapor line valve is closed, gaseous fluid from the primary storage vessel is directed to the vapor space of any of the server vessels associated with a closed server storage vessel bypass vapor line valve and liquefied gaseous fluid is thereby directed from each server vessel associated with a closed server storage vessel bypass vapor line valve to the second vaporizer.

One of the predetermined operating conditions for opening a bypass vapor line valve is when the control system determines the level of liquefied gaseous fluid remaining in a server storage vessel associated with the bypass vapor line valve is below a predetermined level. While one of the predetermined operating conditions for closing a bypass vapor line valve is when the control system determines the level of liquefied gaseous fluid remaining in a server storage vessel associated with the bypass vapor line valve is higher than a predetermined high vessel level target; in which case the predetermined high vessel level target can be set, for example, as a function of a second highest storage vessel liquefied gaseous fluid level to allow the vessels to be drawn down in a balanced manner.

The system can additionally include a pressure regulator disposed on the supply line upstream of the end user for regulating the gaseous fluid pressure delivered to an end user requiring greater control of the delivery pressure range.

A preferred method of storing a gaseous fluid in liquefied form in a plurality of storage vessels and delivering a gas to an end user includes storing the gaseous fluid in liquefied form in a primary storage vessel; storing the gaseous fluid in liquefied form in at least one server storage vessel; measuring the pressure in the at least one server storage vessel; and when the pressure in the at least one server storage vessel is below a predetermined low pressure value, pumping gaseous fluid from the primary storage vessel, increasing the enthalpy of the fluid, and then delivering the fluid to at least one server storage vessel; when the pressure in the at least one server storage vessel rises above a predetermined high pressure value, stopping pumping of fluid from the primary storage vessel; and delivering the fluid as a gas to the end user through a supply line; wherein the predetermined low pressure value and predetermined high pressure values are set based upon predetermined operating conditions.

The method can further include delivering gas to the end user based on the predetermined operating conditions through either (a) directing a portion of the fluid from the primary storage vessel to an at least one server storage vessel bypass vapor line and increasing the enthalpy of the fluid prior to delivering the fluid as a gas to the end user; or (b) directing liquefied gaseous fluid from the at least one server storage vessel into a supply line and transforming the liquefied gaseous fluid into a gas prior to delivering to the end user.

The method can additionally include delivering gaseous fluid from the vapor space of the primary storage vessel to the end user when the primary storage vessel pressure is greater than the predetermined high pressure value, or when a measured temperature is below a predetermined low temperature value. Additionally the method can include delivering liquefied gaseous fluid from the at least one server storage vessel to the end user when the end user fluid flow demand is high. The method can further include measuring the liquefied gaseous fluid level in each storage vessel and directing fluid from a highest fluid level storage vessel to the end user until the measured fluid level from the highest measured fluid level storage vessel is less than a predetermined high vessel level target. The predetermined high vessel level target can be set as a function of a second highest storage vessel fluid level.

Unlike the '539 application, which uses a compressor to build pressure in each of the storage vessels, in the disclosed preferred embodiment, the pressure within the primary vessel can be maintained at a lower pressure with fluid cascading into the one or more server storage vessels which can be maintained at a higher storage pressure by operation of the pump. The presently disclosed arrangement enjoys many of the same benefits as the '794 application in that by having a pump immersed in the primary fluid storage vessel, there is a much shorter delay to raise the pressure in the server vessel to the desired delivery pressure after refueling.

While there are some variables such as the actual fluid saturation pressure, in a typical system, if filled with cold LNG, the time to build the pressure in the server storage vessel can be on the order of about 30 seconds. Additionally, the pump is much more responsive to sustained high fuel demand from the end user. These are improvements compared to prior art systems that use more conventional pressure building circuits and are beneficial for both drivers and filling stations.

Another advantage of the presently disclosed arrangement is that it allows a multi-vessel storage system to be operated with just one pump, which reduces the cost of the system, compared to systems that employ a pump in each storage vessel.

Fuel delivery systems with pumps normally employ an accumulator between the fuel supply and the engine. The purpose of the accumulator is to provide a buffer volume of gaseous fuel at a pressure equal to or higher than the desired injector pressure so that as fuel is consumed, there is a ready store of fuel and there are no abrupt changes in fuel delivery pressure. An advantage of the disclosed arrangement is that the server fluid storage vessel becomes a dual purpose component, serving as both a storage vessel and an accumulator. As a storage vessel, it can have a larger volume than what would typically be needed to serve as an accumulator, but it is kept at the desired pressure so that there is a ready store of fluid available on demand, stored in either liquefied or gaseous form. This allows the fluid delivery system to be simplified by removing a conventional accumulator, reducing the number of components and the cost to build the system.

DETAILED DESCRIPTION OF PREFERRED EMBODIMENT(S)

Figure 1:
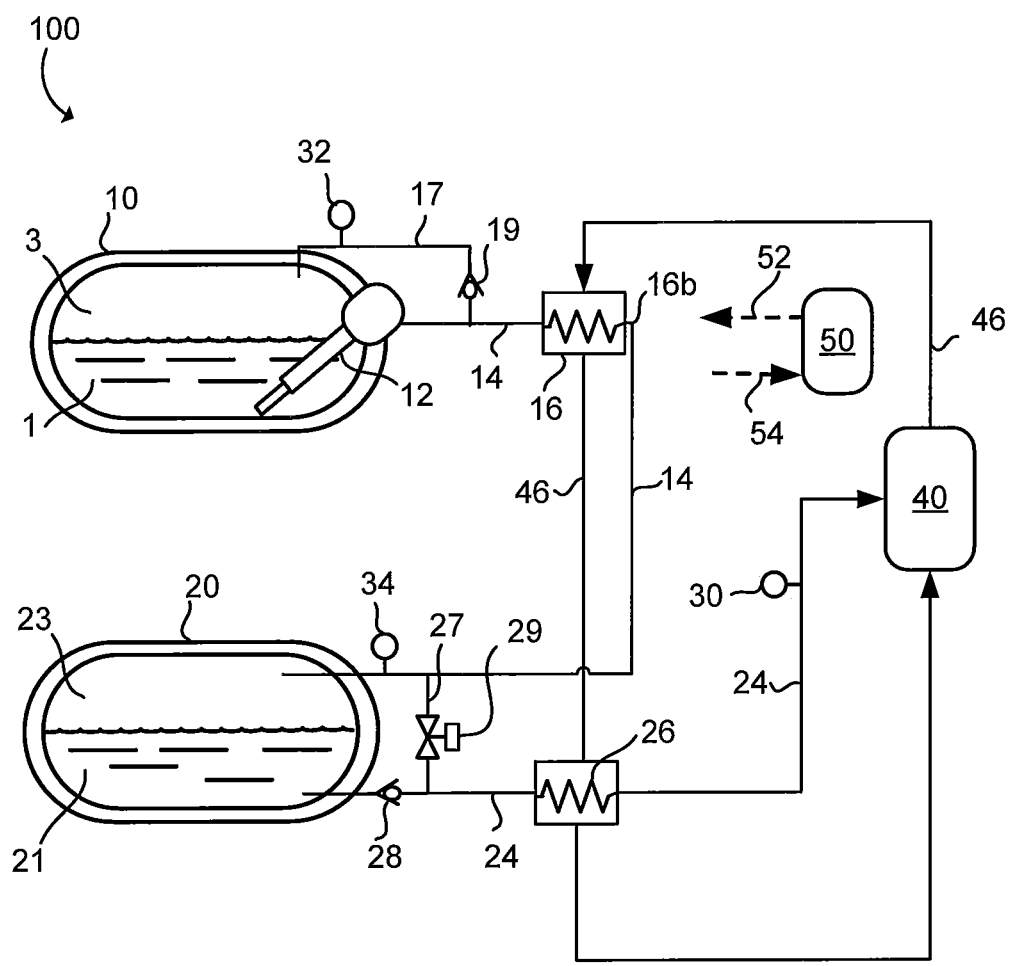
FIG. 1 is a schematic view of an exemplary multi-vessel fuel system illustrating a primary vessel and server vessel embodiment for delivery of a gaseous fuel to an end user.

FIG. 1 is a schematic view of a first embodiment of multi-vessel fuel system 100 comprising primary storage vessel 10 and a secondary, server storage vessel 20. In this first embodiment, pump apparatus 12 is disposed within primary storage vessel 10 where it can be immersed in liquefied gaseous fluid stored therein. Unlike a pump apparatus located external to a storage vessel, pump apparatus 12 does not require any cool-down before operation because it is always at the same temperature as the stored fluid. Cryogenic pumps for delivering liquefied gases need to be at the same temperature as the liquefied gas, because drawing liquefied gaseous fluid into a warmer pump will cause the liquefied gaseous fluid to flash to vapor, which is undesirable because the pump cannot operate properly until the liquefied gaseous fluid stops flashing to vapor and this does not happen until the pump is cooled. So while it is possible to employ an external pump this results in a time delay and the production of low pressure vapor before the system can be started. While the system described herein can employ an external pump that is pre-chilled to cryogenic temperatures in order to reduce the time delay, the system results in a bulkier, less efficient design having more leak paths and therefore is less preferred to embodiments employing a cryogenic pump integrated into primary storage vessel 10.

Liquefied gaseous fluid flows from pump apparatus 12 through discharge line 14 which is in fluid communication with vapor space 23 of server storage vessel 20. Vapor space 23 is an upper region of server storage vessel 20, since stored liquefied gaseous fluid is normally stratified with the higher density liquefied gaseous fluid filling the lower portion 1, 21 of the storage vessel and the vapor filling the upper region 3, 23 of the storage vessel. Fluid flowing through discharge line 14 passes through first vaporizer 16, which can be any device that transfers heat energy into the fluid. For example, this can be an electrical heating element or a burner. In the illustrated embodiment, which is a fuel delivery system for an internal combustion engine 40, there is an available supply of waste heat that can be recovered from the engine coolant so a heat exchanger is shown that receives engine coolant through circulation loop 46 to warm the liquefied gaseous fuel and transform it into a gaseous state before flowing through the continuation of discharge line 14 that leads to server storage vessel 20.

Fluid flowing into the top of server storage vessel 20 from discharge line 14 increases the pressure acting on the gaseous fluid inside server vessel 20. For the most efficient increase in pressure, the fluid is delivered into the top of server storage vessel 20 in either a vapor or gas state. The fluid discharged from pump apparatus 12 increases in enthalpy as it flows through vaporizer 16 by way of discharge line 14, and can be delivered to server storage vessel 20 as a fluid that is in a supercritical state, a liquid state, a vapor state, a gas state, or mixtures thereof. The term "supercritical" is used herein to describe the state of the fluid being at a temperature and pressure above its critical point, where distinct liquid and gas phases do not exist. The temperature and pressure can be fine-tuned such that the fluid being directed through discharge line 14 can behave more like a liquid or more like a gas. Alternatively, if the gaseous fluid increases in enthalpy such that it is a warm gas when delivered to server storage vessel 20, as can be the case for lower pressure system operating conditions, heat is also added to the server vessel. While the warm gas is a secondary source for increasing the pressure inside server storage vessel 20, it is less efficient than vapor and/or cool gas. The term "warm gas" is used herein to describe the gaseous fluid being at an operable temperature to be employed by the end user; typically for internal combustion engines this temperature range is −40 to 85 degrees Celsius (° C.). The increased pressure pushes liquefied gaseous fluid stored in server storage vessel 20 out through supply line 24 through check valve 28 which has an opening pressure greater than that of the head pressure of the liquefied gaseous fluid in server vessel 20. Liquefied gaseous fluid in supply line 24 flows through second vaporizer 26. Like vaporizer 16, in this embodiment it is shown as a heat exchanger that receives engine coolant as the warm fluid that heats the liquefied gaseous fluid to transform it into gas. In the illustrated embodiment the engine coolant flowing to both vaporizers flows through circulation loop 46 with the vaporizers arranged in series. In an alternative embodiment (not shown) the engine coolant can split into branches so that the coolant flows through the vaporizers in parallel.

Figure 2:
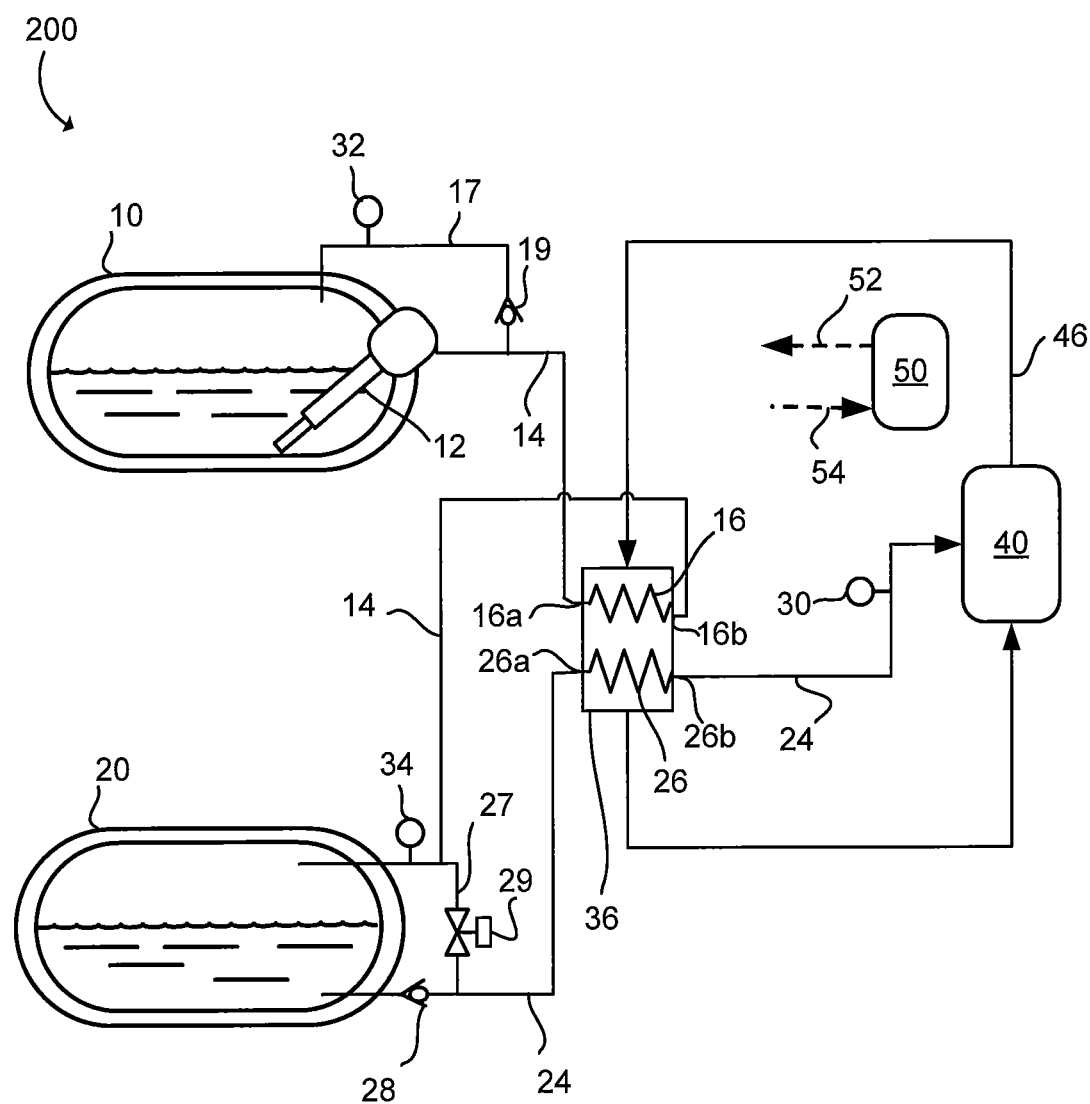
FIG. 2 is a schematic view of an alternate exemplary multi-vessel fuel system illustrating a primary vessel and server vessel embodiment for delivery of a gaseous fuel to an end user employing a single vaporizer.

An alternative embodiment of a multi-vessel fuel storage and delivery system 200 is shown in FIG. 2. Elements in common with the embodiment illustrated in FIG. 1 are referenced by the same reference numbers and if they operate and function in the same way, are not described again in relation to the embodiment of FIG. 2. In this alternate embodiment, instead of first vaporizer 16 and second vaporizer 26 being separately housed as shown in FIG. 1, vaporizer 36 is employed which integrates first vaporizer 16 and second vaporizer 26 in a single housing. Fluid flowing through discharge line 14 from primary storage vessel 10 flows through first vaporizer inlet 16a to first vaporizer outlet 16b to vapor line 27 of server vessel 20. Fluid flowing through supply line 24 flows through second vaporizer inlet 26a to second vaporizer outlet 26b and is delivered downstream to end user 40.

Because the pressure inside server storage vessel 20 can be maintained in a pressure range desired for delivery to end user 40, there is no need for a second pump for discharging the liquefied gaseous fluid from server storage vessel 20. For simple end user systems requiring a constant pressure supply, pump apparatus 12 can be preset to maintain a specific fluid supply pressure to vessel 20 to maintain a required gas supply delivery pressure at end user 40. For more complex end user systems requiring variable gas supply pressures, an electronic controller 50 can be employed to determine an end user required gas supply delivery pressure and control gas pressure flow by controlling activation of pump apparatus 12 and/or the rate of heat transfer to fluid in discharge line 14 accordingly.

Referring again to the exemplary system shown in FIG. 1, pressure sensors 30, 32 and 34 are shown. In the described system disclosed herein, only pressure sensor 30 or pressure sensor 34 is needed to maintain a desired fluid supply pressure to end user 40. Pressure sensor 34 measures the fluid pressure in a conduit that is in fluid communication with the vapor space of server storage vessel 20. That is, by being in fluid communication with the vapor space, the static fluid pressure measured at this point is representative of the pressure inside server storage vessel 20. Pressure losses between server storage vessel 20 and end user 40 are known based on flow rate, so fluid pressure in the supply line can be determined from the pressure measured by pressure sensor 34. Alternately, pressure sensor 30 measures the fluid pressure in a conduit that is in fluid communication with end user 40, like supply line 24; and again, because the pressure losses between server storage vessel 20 and end user 40 are known based on flow rate, the fluid pressure in server storage vessel 20 can be determined from pressure sensor 30. Depending on the system requirements, either pressure sensor 30 or pressure sensor 34 or both can be employed for controlling the desired fluid supply pressure to end user 40. Pressure sensor 32 measures the fluid pressure in a conduit that is in fluid communication with the vapor space of primary storage vessel 10.

The described system can further comprise vapor line 17 that can allow vapor from the vapor space of primary storage vessel 10 to flow into discharge line 14 upstream from vaporizer 16. At times when pressure in storage vessel 10 rises above a predetermined pressure value, pump apparatus 12 can be stopped to allow vapor to flow into discharge line 14. One-way check valve 19 prevents liquefied gaseous fluid from flowing back to primary storage vessel 10 through vapor line 17. Like vapor line 17 for primary storage vessel 10, vapor line 27 can be associated with server storage vessel 20 so that gas can flow straight from discharge line 14 to supply line 24. Valve 29 can be an electronically controlled solenoid actuated valve that is commanded to open or close by an electronic controller based upon the pressure measured by pressure sensor 30 and/or 34. Additionally, valve 29 provides the ability to control the rate at which fluid is supplied to supply line 24 from server vessel 20. When valve 29 is opened, the fluid from vessel 10 can bypass server vessel 20 and go directly to end user 40. Also, when valve 29 is opened, fluid in server storage vessel 20 stops flowing to vaporizer 26, due to check valve 28 having an opening or cracking pressure that is greater than the head pressure of the liquefied gaseous fluid in server storage vessel 20. By opening and closing valve 29, the system can control the draw down of primary vessel 10 and server vessel 20 to draw down more evenly rather than emptying server vessel 20 completely before starting to empty primary vessel 10. This design also advantageously allows a small amount of LNG to remain in server vessel 20, such as at a vessel level of approximately 10%, prior to refueling so server vessel 20 remains cold, making refueling easier.

In alternative arrangements the storage vessels can have a pressure sensor with a probe inside the storage space for measuring internal vessel pressure directly. Additionally, sensors 30, 32 and 34 can be dual pressure and temperature sensors for greater system control.

In preferred embodiments, the control system comprises an electronic controller or electronic control unit ("ECU") 50 that receives pressure measurements from at least one of pressure sensor 30 and/or pressure sensor 34. Reference number 52 in FIG. 1 points to a line with an arrow leading from ECU 50 representing signal outputs or commands sent from ECU 50, for example to pump apparatus 12. A continuous command line connecting ECU 50 to pump apparatus 12 is not shown to avoid complicating this schematic illustration. Similarly, reference number 54 points to a line with an arrow leading into ECU 50, representing signal inputs such as measured data from sensors, for example from pressure sensor 30.

ECU 50 can be a stand-alone unit or, in the shown embodiment, when the system is a fuel storage and delivery system for an engine, ECU 50 can be part of a larger unit that also controls the engine, after-treatment, vehicle or other associated systems. For controlling the illustrated fluid storage and delivery system, ECU 50 is programed to control the operation of pump apparatus 12 based on the measured pressures determined from respective signals received from pressure sensors 30, 32 and 34. For example, when pressure sensor 34 measures a pressure lower than a predetermined low pressure value, ECU 50 commands pump apparatus 12 to operate so that fluid from primary storage vessel 10 cascades into server storage vessel 20, through discharge line 14 and vaporizer 16 so that gas flows into the vapor space of server storage vessel 20. When pressure sensor 34 (or 30 depending on the system design) measures a pressure higher than a predetermined high pressure value, then ECU 50 commands pump apparatus 12 to stop. In fluid delivery systems that are designed to deliver the fluid at different pressures depending upon different end user operating conditions, the low and high pressure values can be adjusted as a function of the end user operating conditions which can include gas flow demand as well as end user operating modes; such as, but not limited to, a cold start mode, an economy mode, a power mode, and a refueling mode. For example, as gas flow demand increases, the low and high pressure values can be increased to keep up with gas flow demand. When the system is a fuel storage and delivery system for a vehicular or mobile engine system, the gas flow demand can be determined from such inputs as engine rpm, torque, throttle position, rate change of throttle position and other inputs known to those skilled in the art.

Figure 3:
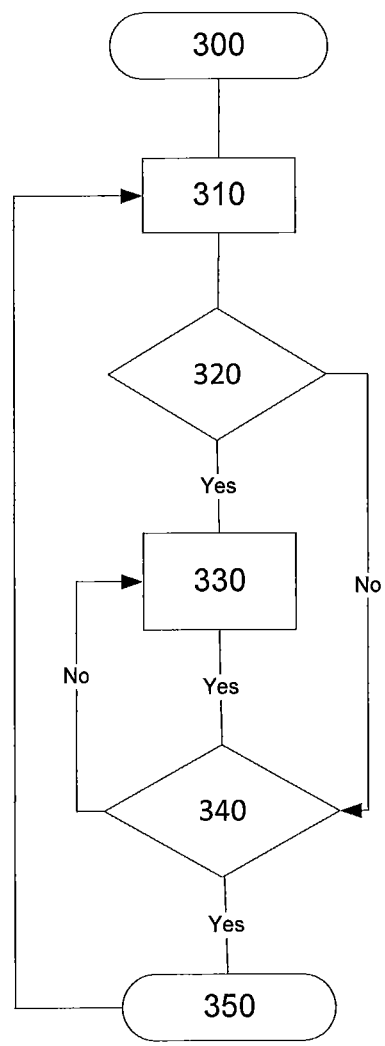
FIG. 3 is a flow chart depicting the steps of a method for controlling fluid system pressure in a multi-vessel fuel system for delivery of a gaseous fuel to an end user.

FIG. 3 illustrates the method employed by ECU 50 for normal operation. After starting at step 300, at step 310 the ECU determines the supply pressure based on inputs from at least one of pressure sensor 30 and 34. At step 320 if the supply pressure is below a low pressure value ($P_{low}$), then the next step is step 330 where pump apparatus 12 is activated to begin to increase flow to vaporizer 16. Then at step 340, ECU 50 determines if the supply pressure is higher than the high pressure value ($P_{high}$), and if it is still below the high pressure value then step 330 is repeated until supply pressure is higher than the high pressure value, at which time pump apparatus 12 is stopped at step 350, after which ECU 50 returns to step 310 to monitor fuel supply pressure. ECU 50 can also arrive at step 340 if it is determined at step 320 that the supply pressure is not lower than the low pressure value.

Figure 4:
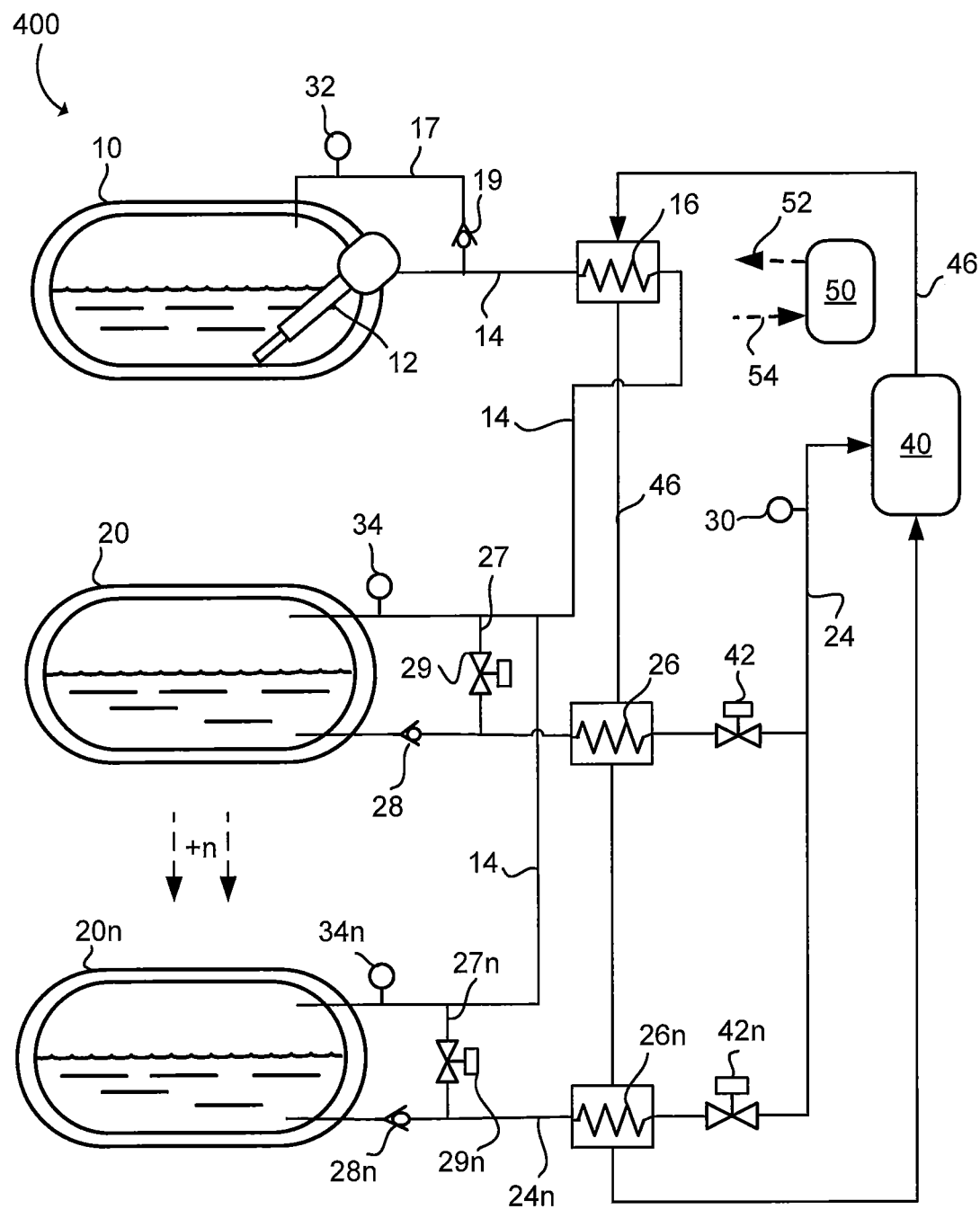
FIG. 4 is a schematic view of an alternate embodiment of a multi-vessel fuel system in which "n" number of server vessels are incorporated into the system.

Referring to FIG. 4, an alternate embodiment of a multi-vessel fuel system 400 is shown in which "n" number of server vessels are incorporated into the system. Elements in common with the embodiment illustrated in FIG. 1 are referenced by the same reference numbers and if they operate and function in the same way, may not be described again in relation to the embodiment of FIG. 4. Liquefied gaseous fluid flows from pump apparatus 12 through discharge line 14 which is in fluid communication with the vapor space of each server vessel (vessels 20 to 20n). Fluid flowing through discharge line 14 passes through first vaporizer 16 which adds enthalpy to the fluid and for the most efficient pressure increase, transforms the fluid into a vapor and/or gas, before flowing through the continuation of discharge line 14 that leads to each server vessel (20 to 20n). Fluid flowing into the top of each server storage vessel (20 to 20n) from discharge line 14 increases the pressure inside each server vessel. The increased pressure pushes liquefied gaseous fluid stored in server storage vessels 20 to 20n through respective check valves 28 to 28n and through respective supply lines 24 to 24n. Liquefied gaseous fluid in supply line 24 passes through second vaporizer 26, and in this embodiment, liquefied gaseous fluid in supply line 24n passes through separate vaporizer 26n before being directed to end user 40 through supply line 24. The embodiment in FIG. 4 includes fluid system shut-off valves 42 to 42n that are operable by command of ECU 50 to a closed position to isolate the fluid supply to end user 40. Depending on the system, in addition to or as an alternative to shut off valves 42 to 42n, each server vessel (20 to 20n), as well as vessel 10, can have fluid isolation valves upstream of the vaporizers as an additional safety measure for stopping fluid flow to the vaporizers and end user 40.

Figure 5:
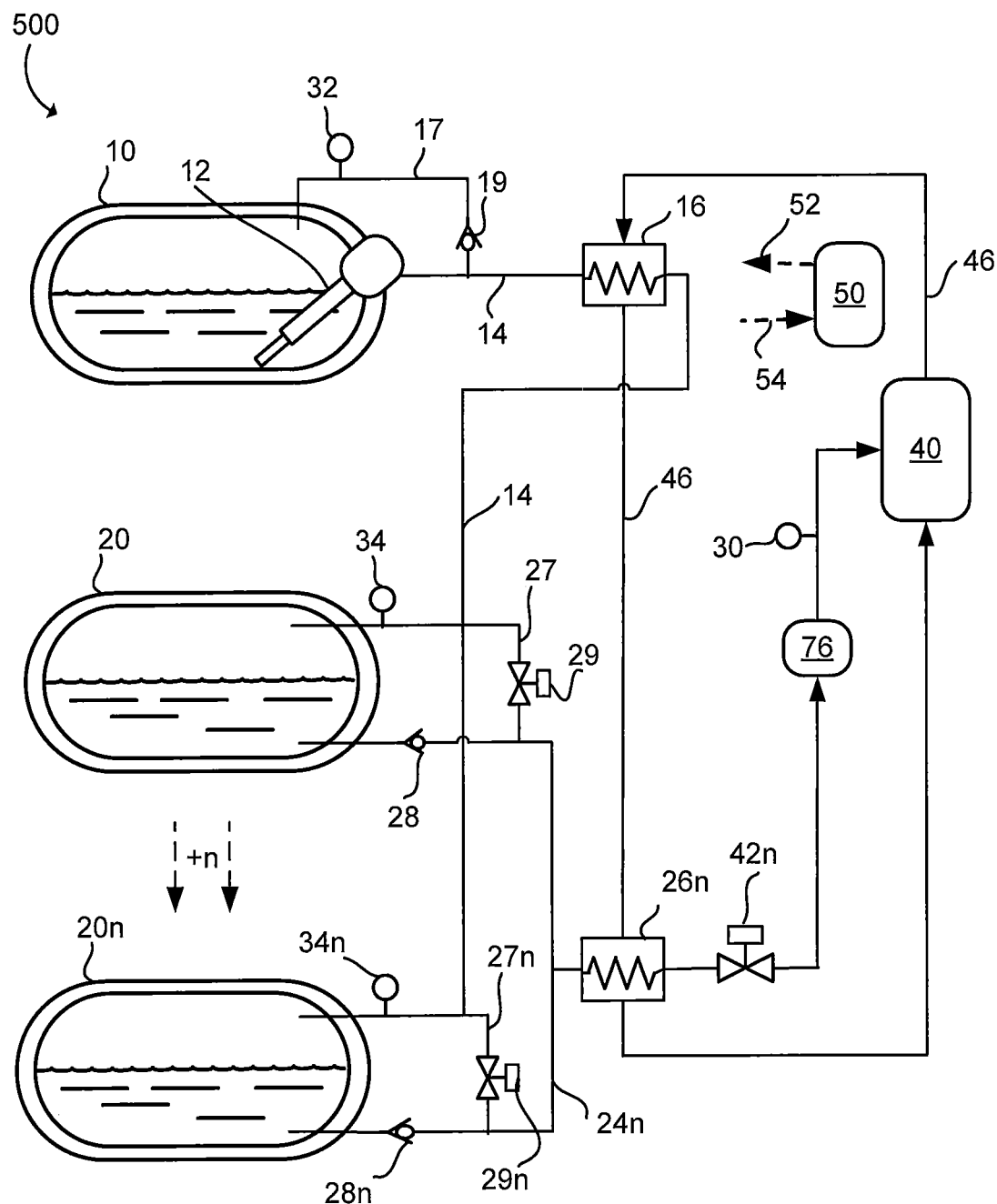
FIG. 5 is a schematic view of another exemplary multi-vessel fuel system in which "n" server vessels supply fuel through a single vaporizer prior to delivery to an end user.

Another embodiment of a multi-vessel fluid storage and delivery system 500 is illustrated in FIG. 5 having supply lines 24 and 24n merging upstream of vaporizer 26n where fluid from all server vessels 20 to 20n can pass there through for delivery to end user 40. Optional pressure regulation device 76 is positioned on supply line 24 downstream of vaporizer 26n and can be employed as an additional means of controlling the fluid delivery pressure to end user 40. Shut-off valve 42n is positioned downstream of vaporizer 26n to isolate the storage vessels from end user 40 when not in operation. Elements in common with the embodiments illustrated in FIGS. 1, 2 and 4 are referenced by the same reference numbers and if they operate and function in the same way, may not be described again in relation to the embodiment of FIG. 5.

Similar to the embodiment shown in FIG. 1, the pressure inside each server vessel (20 to 20n) shown in FIGS. 4 and 5 can be determined from any of individual pressure sensors (34 to 34n) placed on vapor line 14 or from pressure sensor 30 when any one of vapor lines (27 to 27n) is in fluid communication with end user 40. Depending on the system requirements, any one of, or all of, pressure sensor 30 and pressure sensors (34 to 34n) can be employed for controlling the desired fluid supply pressure to end user 40.

Operation of the multi-vessel fluid storage and delivery system will be further explained with respect to the end user being an internal combustion engine system. Exemplary system operating modes along with control strategies implemented by ECU 50 are now described.

Figure 6:
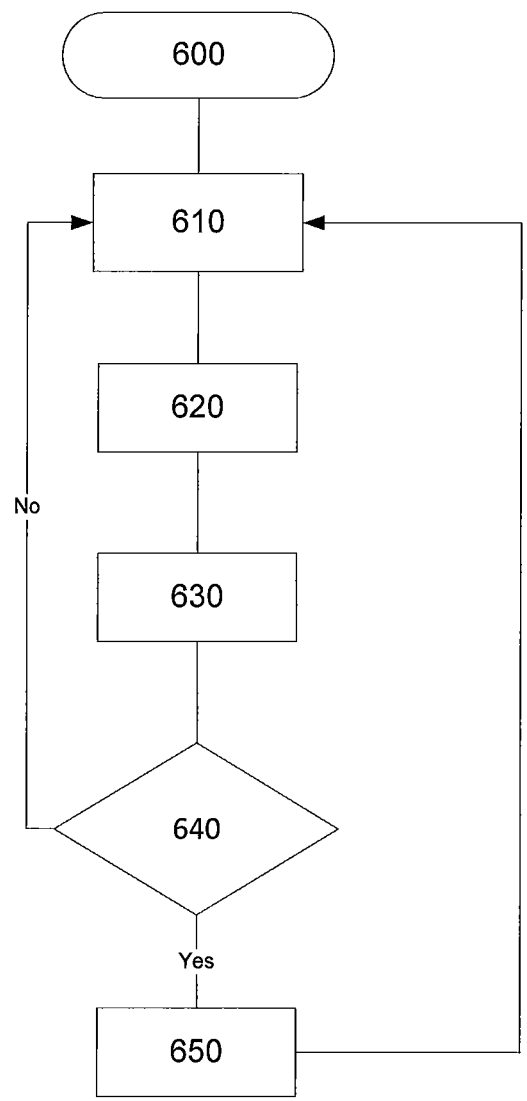
FIG. 6 is a flow chart depicting the steps of a method for evenly drawing down the storage vessels in a multi-vessel fuel system for delivery of a gaseous fuel to an end user.

A vessel balancing strategy in which the fluid levels in each storage vessel are drawn down evenly can be employed when, for example, in an extended engine operation mode. In this mode, ECU 50 actuates one or more valves to keep the level of fluid being drawn down from each of storage vessel 10 and server storage vessels (20 to 20n) even. FIG. 6 illustrates a step down method which may be employed by ECU 50 for balancing the liquefied gaseous fluid level in each storage vessel. After starting at 600, ECU 50 determines the level of liquefied gaseous fluid in each storage vessel at step 610, and sets a high vessel level target ($L_T$) to a predetermined incremental amount below the fluid level of the next highest storage vessel at step 620. The incremental amount can be for example 5-10% below that of the next highest level vessel. One or more valves (29 to 29n) is actuated at step 530 to select the vessel having the highest level of liquefied fuel for supplying to end user 40. At step 640, ECU 50 determines if the level of the highest level vessel is below the set high vessel level target. If not, then the logic flow is directed back to step 610 where ECU 50 again determines vessel levels. If yes, the level of the highest level vessel is now below that of the set high vessel level target and at step 650, one or more valves is actuated to switch vessels and the steps are repeated at step 610 where ECU 50 again determines the vessel levels in each vessel. Persons skilled in the art will understand that different methods can be used for measuring the level of liquefied gaseous fluid remaining in each storage vessel, and will also understand that the determination of level can be made more accurate by averaging level measurements to compensate for sloshing, and/or correcting for when a vehicle is tilted or at an angle (going up or down an incline).

For the embodiment shown in FIG. 1 for example, when in a mode where the balancing strategy is employed, ECU 50 determines for instance that the fluid level in vessel 10 is 20% higher than server vessel 20. ECU 50 then actuates vapor line valve 29 to an open position allowing fluid from vaporizer 16 to pass through vaporizer 26 in supply line 24 to engine 40. When at step 540, ECU 50 determines the level in vessel 10 is below the level of server vessel 20 by a predetermined incremental amount (say 5%); ECU 50 actuates vapor line valve 29 to a closed position and liquefied gaseous fluid stored in server storage vessel 20 then flows out through supply line 24 through check valve 28 to vaporizer 26 where warm gas then exits and is delivered to engine 40 at a desired pressure.

Following the same logic flow of FIG. 6, an exemplary method of balancing fluid levels for a system having more than one server vessel, as shown in FIGS. 3 and 4 is now described with the example of ECU 50 determining vessel 20 has the highest fluid level and vessel 20n has the next highest fluid level. ECU 50 then sets the high vessel level target for server vessel 20 to a predetermined incremental amount below that of server vessel 20n. ECU 50 actuates vapor valve 29 closed and 29n open so that liquefied gaseous fluid is pushed out of vessel 20 and directed to supply line 24. Because vapor valve 29n is open, the pressure in vapor line 27n keeps the liquefied gaseous fluid from server vessel 20n from exiting past check valve 28n. Fluid in server vessel 20 is drawn down and then at step 640 of FIG. 6, when ECU 50 determines the fluid level in server vessel 20 is below the high vessel level target, actuates vapor valve 29n closed at step 650; and ECU 50 then determines all the vessel fluid levels again at 610 and resets the high vessel level target at step 620. In this manner all the vessels can be drawn down evenly when in, for example, an extended operation mode.

When multiple server vessels (20 to 20n) shown in embodiments FIGS. 4 and 5 are at roughly an even fluid level, ECU 50 can actuate vapor line valves (29 to 29n) all closed, whereby engine 40 is supplied by liquefied gaseous fluid from all the server vessels in generally equal amounts; drawing down the vessels evenly. Additionally, for the system embodiments illustrated in FIGS. 4 and 5, when the fluid levels are not at similar levels in server vessels (20 to 20 n), the system design allows for rebalancing of the fluid levels in the server vessels through the closing of one or more respective shut-off valves (42 to 42n) to the server vessel(s) having the lower fluid level until the fluid levels have become balanced. This control logic cannot be employed for the system embodiment shown in FIG. 5 because the supply line from the server vessels merge to a single supply line prior to passing through vaporizer 26n.

For a cold start mode, when for example the coolant temperature in coolant circulation loop 46 is not hot enough to vaporize the liquefied gaseous fluid exiting the storage vessels; a control strategy is followed to protect vaporizers 26 and 26n. If ECU 50 determines engine coolant is below a predetermined low temperature value; such as zero degrees Celsius (° C.), vapor line valve 29 is opened allowing fluid from either pump apparatus 12 to flow to discharge line 14 or from the vapor space of vessel 10 to flow to discharge line 14 (through vapor line 17) and bypass server vessel 20 using vapor line 27, passing through vaporizer 26 to engine 40. When ECU 50 determines the engine coolant is above a predetermined low temperature value, vapor valve 29 is closed. For multiple server vessels, valves 29 to 29n would all be actuated by ECU 50 such that only fluid from vessel 10 is supplied to engine 40 until ECU 50 determined that the coolant temperature was above the predetermined low temperature value.

For a warm start mode, when for example the pressure in the vessels (10, 20 to 20n) is high from the system not being operated for 5-10 days or when the vessels are filled with warm fuel, ECU 50 does not activate the LNG pump apparatus while the vapor in the vessels is at sufficient pressure to satisfy the engine demand. When the pressure in vessels 20 to 20n falls below a predetermined lower pressure value then ECU 50 activates pump apparatus 12 to increase the server vessel pressures.

For a power mode, in which certain demanding engine conditions require a high fuel demand, ECU 50 sets the high pressure value ($P_{high}$) to a predetermined high pressure threshold designed for high fuel demand conditions, actuates all vapor line valves (29 to 29n) closed, and commands pump apparatus 12 to a high fluid flow output to increase pressure in server vessels (20 to 20n) to purposely push a higher flow of liquefied gaseous fluid out of server vessels (20 to 20n) to one or more vaporizers on supply line 24 to satisfy the high fuel demand. ECU 50 can then switch to a vessel balancing strategy once the demanding conditions are met and operate pump apparatus 12 and vapor valves 29 to 29n to allow for the balancing of fluid levels across all the vessels.

A refueling mode can be advantageously employed in the disclosed systems shown in FIGS. 1, 2, 4 and 5; for example when the level of liquefied gaseous fluid in one or more of the server vessels (20 to 20n) is low (for example 5 to 10% of total volume) and the driver/operator anticipates refueling. Refueling time can be reduced by leaving some liquefied gaseous fluid inside one or more server storage vessels (20 to 20n) to prevent the one or more server vessels from getting warmer, which can increase refueling time. The low fluid level server vessel(s) is bypassed by ECU 50 opening the respective vapor line valve (29 to 29n) associated with the low fluid level server vessel(s). If every server vessel (20 to 20n) is low on fuel then ECU opens all the vapor line valves (29 to 29n) so that engine 40 is being supplied only from vessel 10. This allows the driver to refuel at a faster rate than when all the remaining fluid from vessels 20 to 20n is used and the vessels are allowed to warm prior to refueling.

In general, for engine fuel systems that deliver the fuel into the intake air system, abrupt changes in fuel delivery pressure are hard to manage. Preferably the fuel is delivered at a steady fuel supply pressure, or if there is a desire to change fuel supply pressure, it is changed gradually. This is well suited to the disclosed multi-vessel fluid storage and delivery arrangement because the server storage vessel(s) serve dual roles as both a storage vessel and an accumulator, providing a very large buffer of fuel stored at the desired supply pressure. That is, this large buffer helps to smooth transient engine demands making it easier to manage the system pressure.

It is noted that the schematic illustrations are simplified to better show the features of the disclosed embodiments. Persons skilled in the art will understand that there are many other elements of a fuel storage and delivery system that are part of a complete system but that are not shown, for example, without limitation, pressure relief systems, valves to isolate the storage vessels and other components for maintenance, and if the pump apparatus is hydraulically actuated, a hydraulic drive and associated hydraulic fluid lines.

While particular elements, embodiments and applications of the presently disclosed multi-vessel fuel system have been shown and described, it will be understood, that the invention is not limited thereto since modifications can be made by those skilled in the art without departing from the scope of the present disclosure, particularly in light of the foregoing teachings.

What is claimed is:

1. A method of storing a gaseous fluid in liquefied form in a plurality of storage vessels and delivering a gas to an end user, the method comprising:
    storing gaseous fluid in liquefied form in a primary storage vessel;
    storing gaseous fluid in liquefied form in a server storage vessel;
    measuring a pressure in the server storage vessel;
    when the pressure in the server storage vessel is below a low pressure value, pumping fluid from the primary storage vessel, increasing enthalpy of the fluid to transform the fluid into a gaseous state, and then delivering the fluid in the gaseous state to the server storage vessel;
    when the pressure in the server storage vessel rises above a high pressure value, stopping pumping of fluid from the primary storage vessel; and
    delivering the fluid as a gas to the end user through a supply line;
    wherein the low pressure value and high pressure value are set based upon operating conditions.

2. The method of claim 1, further comprising delivering gas to the end user based on the operating conditions through either:
    a. directing a portion of fluid from a vapor space of the primary storage vessel to a server storage vessel bypass vapor line and increasing enthalpy of the fluid prior to delivering the fluid as a gas to the end user; or
    b. directing liquefied gaseous fluid from the server storage vessel into a supply line and transforming the liquefied gaseous fluid into a gas prior to delivering to the end user.

3. The method of claim 1, wherein the operating conditions include at least one of an end user fluid flow demand, storage vessel liquefied gaseous fluid level, and a measured temperature that correlates to an operational temperature of a first vaporizer.

4. The method of claim 1, further comprising delivering fluid from a vapor space of the primary storage vessel to the end user when the primary storage vessel pressure is greater than the high pressure value.

5. The method of claim 1, further comprising delivering fluid from a vapor space of the primary storage vessel to the end user when a measured temperature is below a low temperature value.

6. The method of claim 1, further comprising directing liquefied gaseous fluid from the server storage vessel to a supply line and transforming the liquefied gaseous fluid to a gas prior to delivering to the end user when the end user fluid flow demand is high.

7. The method of claim 2, further comprising directing liquefied gaseous fluid from the server storage vessel to a supply line and transforming the liquefied gaseous fluid to a gas prior to delivering to the end user when the end user fluid flow demand is high.

8. The method of claim 1, further comprising determining a liquefied gaseous fluid level in each storage vessel and directing fluid from a highest fluid level storage vessel to the end user until a measured fluid level from the highest fluid level storage vessel is less than a set high vessel level target.

9. The method of claim 8, wherein the high vessel level target is set as a function of a second highest storage vessel fluid level.

10. The method of claim 2, further comprising determining a liquefied gaseous fluid level in each storage vessel and directing fluid from a highest fluid level storage vessel to the end user until a measured fluid level from the highest fluid level storage vessel is less than a set high vessel level target.

11. The method of claim 10, wherein the high vessel level target is set as a function of a second highest storage vessel fluid level.

12. The method of claim 2, further comprising opening a bypass vapor line valve when a control system determines a level of liquefied gaseous fluid remaining in a server storage vessel associated with the bypass vapor line valve is below a predetermined level.

13. The method of claim 2, further comprising opening a bypass vapor line valve associated with a server storage vessel prior to refueling such that liquefied gaseous fluid remains in said associated server storage vessel.

14. The method of claim 8, wherein the high vessel level target is set according to an incremental amount below a fluid level of the next highest storage vessel.

15. The method of claim 10, wherein the high vessel level target is set according to an incremental amount below a fluid level of the next highest storage vessel.

16. The method of claim 1, wherein the server storage vessel is one of a plurality of server storage vessels.

17. The method of claim 16, further comprising determining a liquefied gaseous fluid level in each server storage vessel and closing a shut-off valve associated with a server storage vessel having a lower fluid level than another server storage vessel.

18. The method of claim 2, wherein the server storage vessel is one of a plurality of server storage vessels.

19. The method of claim 18, further comprising determining a liquefied gaseous fluid level in each server storage vessel and closing a shut-off valve associated with a server storage vessel having a lower fluid level than another server storage vessel.

* * * * *